(12) United States Patent
Baeten et al.

(10) Patent No.: US 6,266,620 B1
(45) Date of Patent: Jul. 24, 2001

(54) DETECTION OF GROUND ROLL CONE

(75) Inventors: Guido Jozef Maria Baeten, Crawley; Erwann Lemenager, London, both of (GB)

(73) Assignee: Schlumberger Technology Corporation, Houston, TX (US)

( * ) Notice: Subject to any disclaimer, the term of this patent is extended or adjusted under 35 U.S.C. 154(b) by 0 days.

(21) Appl. No.: 09/297,879

(22) PCT Filed: Nov. 5, 1997

(86) PCT No.: PCT/GB97/03039

§ 371 Date: May 10, 1999

§ 102(e) Date: May 10, 1999

(87) PCT Pub. No.: WO98/22835

PCT Pub. Date: May 28, 1998

(30) Foreign Application Priority Data

Nov. 15, 1996 (GB) .................................................. 9623945

(51) Int. Cl.$^7$ ...................................................... G01V 1/00
(52) U.S. Cl. ................................................. 702/17; 702/14
(58) Field of Search .......................... 702/17, 14; 367/69, 367/72

(56) References Cited

U.S. PATENT DOCUMENTS

| | | |
|---|---|---|
| 5,014,249 | 5/1991 | Brink . |
| 5,237,538 | 8/1993 | Linville, Jr. et al. . |
| 5,237,539 * | 8/1993 | Selman ................................... 367/69 |
| 5,572,483 * | 11/1996 | Chambers .............................. 357/45 |
| 5,579,282 | 11/1996 | Barr . |

FOREIGN PATENT DOCUMENTS

| | | |
|---|---|---|
| 2273358 | 6/1994 | (GB) . |
| 2309082 | 7/1997 | (GB) . |

OTHER PUBLICATIONS

Yilmaz, O, "Seismic Data Processing", 1987, SEG, Tulsa Print Date 1987, p. 40–41 Only. Doc, XP002056349 Fundamentals, Seismic Data Processing p. 40 and 41.

* cited by examiner

*Primary Examiner*—Christine Oda
*Assistant Examiner*—Victor J. Taylor
(74) *Attorney, Agent, or Firm*—John H Bouchard

(57) ABSTRACT

The present invention relates to a method to detect areas of acquired seismic data that contain ground roll. The method according to the invention allows the detection of ground roll cone on the basis of an estimate of the local ground roll velocity or even without any knowledge of the ground roll velocity. The method according to the invention is further more very useful for an automatic process of ground roll detection.

20 Claims, 10 Drawing Sheets

FIG.10
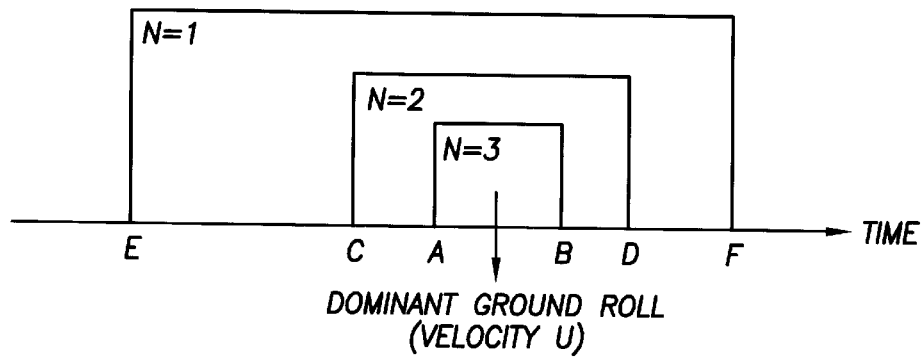
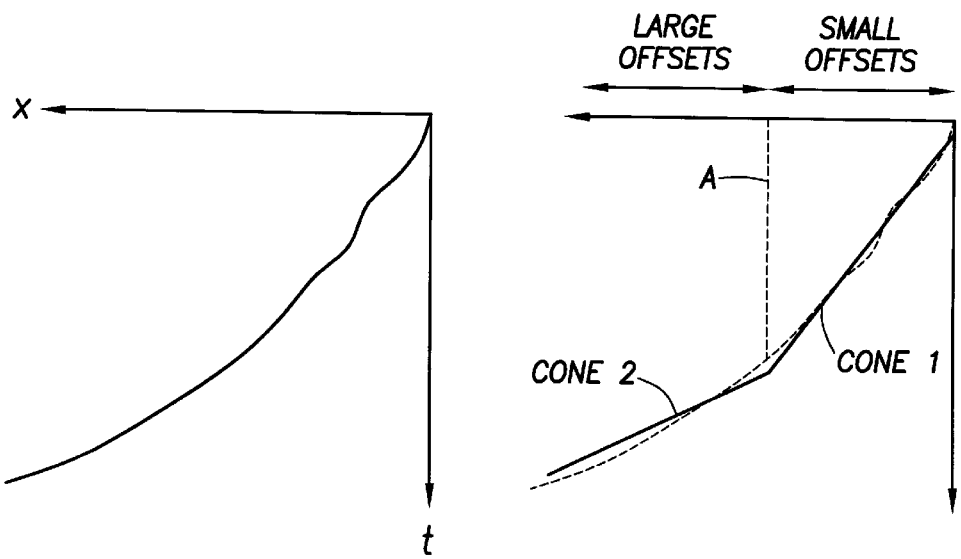
FIG.11a   FIG.11b

DETECTION OF GROUND ROLL CONE

BACKGROUND OF THE INVENTION

1. Field of Invention

The present invention relates to a method of detecting coherent noise, in particular ground roll, in acquired seismic data. Ground roll typically occurs over a particular time portion of the acquired seismic data, which portion is often referred to as the ground roll cone.

2. Description of Prior Art

An improvement of signal fidelity in seismic data acquisition requires, among other factors, an attenuation of coherent noise, in particular ground roll. A conventional method to attenuate such ground roll is the deployment of geophone arrays; the drawbacks of this conventional method are well known.

Apart from this technique of grouping geophone output signals, several other methods have been thought of to eliminate coherent noise, mainly surface waves such as ground roll, during the processing of recorded seismic data. Special, so-called adaptive, noise filter methods have been developed that yield good noise attenuation results. One of the drawbacks of such adaptive filters is that they can be applied only in that part of the data where the coherent noise dominates the desired seismic reflection energy. Outside this area, an application of adaptive filtering can deteriorate genuine reflection signals.

In order to allow the application of adaptive ground roll filtering a determination of the data area that contains dominant coherent noise is essential.

SUMMARY OF THE INVENTION

It is therefore an object of the present invention to provide a method of preparing seismic acquisition data for further filtering by detecting the ground roll cone.

It is another of the present invention to provide a method of detecting ground roll containing data in an automatic fashion, to facilitate bulk processing of seismic data using this process.

BRIEF DESCRIPTION OF THE DRAWINGS

The present invention will be better understood from the following detailed description when taken into conjunction with the attached drawings in which:

FIG. 10 illustrates time windows corresponding to the data blocks according to FIG. 9;

FIGS. 11a and 11b illustrate the parametrization of ground roll area FIGS. 11a and 11b illustrating when the ground roll area is not desired to be parameterized by only a single line, FIG. 11a illustrating the arrival times which have been obtained from the above explained detection scheme are separated into two offset ranges, FIG. 11b illustrating that, for each offset range, a separate average is constructed as shown in FIG. 11b;

DETAILED DESCRIPTION OF THE PREFERRED EMBODIMENT

Figure 1A:
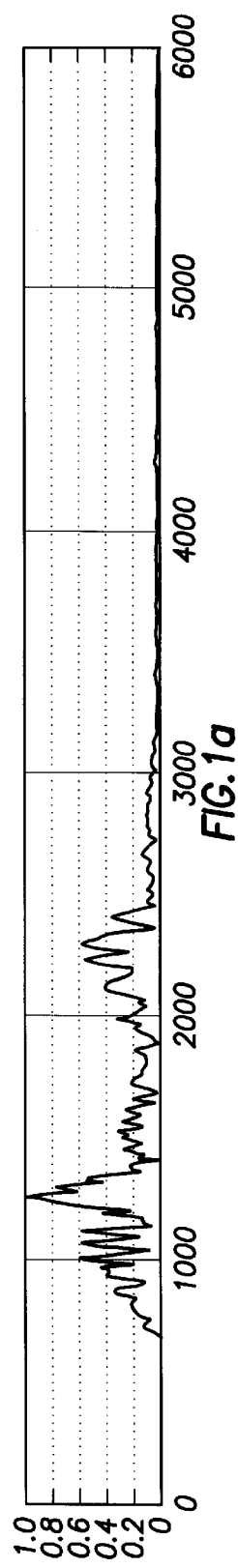
FIG. 1 illustrates envelope curves of data treated according to the invention.
Figure 1B:
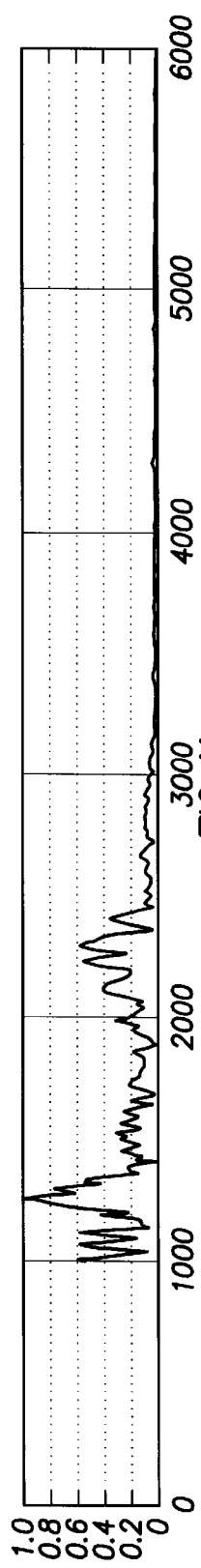
Figure 1C:
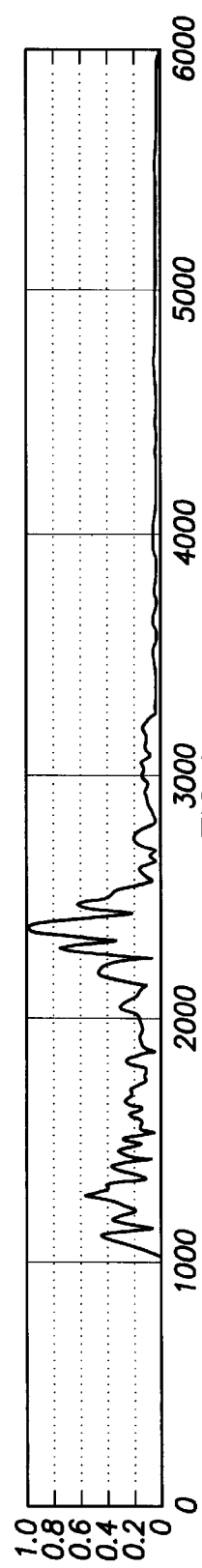
Figure 1D:
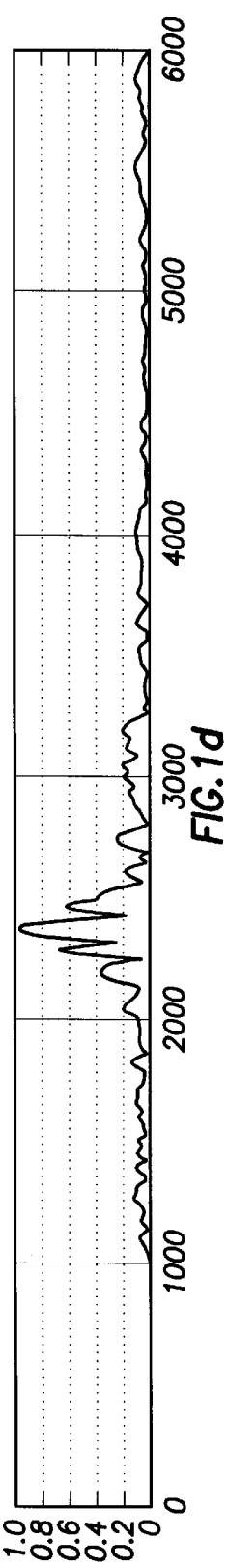

Referring to FIGS. 1 through 14, in the following description text the detection of the primary ground roll cone according to the invention will be discussed. The term "primary ground roll cone" shall mean the particular data area that contains such part of the ground roll which travels directly from a seismic source to the geophones. For simplicity reasons the estimate the ground roll cone is discussed for single shot gathers.

The method according to the invention will be first explained in respect to a so-called "dual sensor scheme" where ground roll velocity information is obtained from input raw data of at least two (adjacent) geophones of one particular receiver station. Later in the text another embodiment of the inventive method will be presented that at least requires input raw data from only one single geophone in combination with an initial estimate of the local ground roll velocity. This method will be further referenced to by "single sensor scheme".

The dual sensor scheme:

Starting point is a single data trace. It is assumed that the coordinates of both the source and the data trace are known. There are three basic physical characteristics of the ground roll that are considered for the invention:

a. The ground roll has relatively high amplitudes in respect to the desired seismic reflection signal.
b. The ground roll is predominantly present at the lower frequencies.
c. The ground roll travels with an apparent velocity which is lower than most other types of seismic energy.

To start with, a trace of raw seismic data is selected that represents signals of a particular geophone of a receiver station.

Prior to any other steps, the first part of the data is eliminated and excluded from further treatment, thereby removing high amplitude first breaks. In order to determine the interval of the data to be declared zero an upper limit for the surface wave velocity has to be defined.

Surface waves have an average velocity which is approximately equal to the shear wave velocity in the deepest layer of interest. As the surface wave amplitude decays exponentially with depth, the deepest layer of interest is therefore in the order of magnitude of one wavelength. So far, field seismic data have not shown values of shear wave velocity at shallow depth which exceed 1000 m/s. This makes this value of velocity very convenient to be used to constrain the average surface wave velocity to this maximal limit. (However, other values may be useful as well. For example, if there is some a-priori-information on the surface wave behavior in a particular area, the constraint may be adapted accordingly.) The maximum average velocity defines a mute time equal to the ratio of source-receiver distance and the maximum average velocity. The mute time should preferably be larger than the first arrivals, so that the large-amplitude first-arrivals are no longer present in the data. In practice, this is easily achieved, since the surface waves are normally at least two times slower than the direct (P-) wave arrival.

Next, a band-pass filter is applied to the data, preferably using retaining frequencies between 10 and 30 Hz. Since ground roll normally is dominated by these lower frequencies, this step will further amplify the ground roll relative to the other energy which normally is more broad-band. Optionally, the band-pass filter could be applied via known Quadrature Mirror Filters which has the distinct advantage that the number of necessary samples is reduced significantly.

The following step applied to the data trace is an amplitude correction that consists of two terms: a spherical divergence correction (or geometrical spreading correction) and a correction for absorption of seismic energy.

Usually in standard seismic processing, the spherical divergence correction is one of the first processes which is applied routinely to the acquired data and that serves to attenuate the shallow reflection energy relative to later arrivals (including the ground roll). The reason for applying this correction is that the wave front (for seismic reflection energy) spreads out with distance r proportional to $1/r^2$; consequently, the amplitudes of seismic reflection waves are attenuated proportional to 1/r. For a layered earth, the correction factor S can be approximated as $$S = \left[\frac{v(t)}{v(0)}\right]^2 \times \frac{t}{t(0)}$$

in which v(t) denotes the RMS velocity of the primary reflections, and v(0) is the velocity value at a specified time t(0). The surface waves have a cylindrical rather than spherical amplitude decay; thus, the amplitude correction S will over-correct the surface waves. This is desired, as will be explained later in this text section.

For correcting absorption it is assumed that monochromatic waves are attenuated by $\exp(-a\omega t)$, leading to a loss of high frequencies, and consequently to lower signal strength. Restoring an original energy content approximately by integrating the absorption function over all frequencies leads to a correction which is proportional to time t. Again, due to their lower frequency content, the surface waves are attenuated less than predicted, and surface wave amplitudes will be over-corrected.

The spherical divergence correction and the absorption correction together lead to an amplitude correction proportional to $t^2$. The velocity term in the spherical divergence correction is ignored because it is data-dependent; also there is not need for accurate amplitude recovery. The resulting $t^2$-correction has the advantage that surface wave amplitudes are strengthened relative to the reflection amplitudes.

Discrimination is also achieved between ground roll and other types of seismic energy on the basis of move-out differences between these types of waves. To enhance the discriminating function of the move-out, an NMO-correction is applied to the data, using a constant NMO-velocity. The NMO-correction is performed by time-shifting each sample of each trace by an amount Δt which is equal to $$\Delta t = -\frac{x^2}{2tV_{NMO}^2}$$

in which x denotes offset, $V_{NMO}$ denotes the constant NMO-velocity, and t denotes time. The consequences for applying the NMO-correction are discussed in more detail later in the text. The NMO-velocity should be in the same order as, or slightly larger than, the maximum group velocity. For a maximum group velocity of 1000 m/s, an NMO velocity between 1000 and 1500 m/s gives good results. Choosing a high NMO-velocity (such as 5000 m/s) will leave the data virtually unaltered; choosing a very low NMO-velocity (such as 500 m/s) will lead to unacceptable frequency shifts in the data.

In FIG. 1, the first three steps described before, initial mute filter, band-pass filter and spherical ($t^2$-amplitude) correction are applied to pre-condition the data in such a way, that the surface wave energy is amplified relative to the seismic energy, in terms of amplitude and bandwidth. For better understanding the effects of applying these steps are illustrated in FIG. 1 which, for simplicity reasons, shows a data set for a particular offset that was treated according to the invention. The shown trace is normalized with respect to its maximum value (envelope). From top to bottom the curves present:

raw data data with a 1000 m/s average velocity maximum (initial mute) applied data with initial mute and 10–30 Hz band-pass filter applied data with initial mute, 10–30 Hz band-pass filter and $t^2$-type spherical divergence correction applied.

No results after NMO-correction are shown because the NMO-correction itself does not amplify the ground roll relative to the seismic reflections.

The ground roll velocity in this example is large (between 700 and 1000 m/s). The benefit of applying the pre-processing is evident: The ground roll is accentuated quite dramatically relative to the other events, by applying the aforementioned filters.

The next step will make use of the fact that the amplitude (or energy) behavior of the seismic data is a function of time and can serve as an indicator of the wave type. Distinct local (instantaneous) values of the trace energy are not necessary, but having such information as an average over a certain time window is preferred. Thus, introducing some smoothing will facilitate proper implementation of the remaining data processing steps and improve the robustness of the method. The length of the time window is chosen such that it corresponds to a required accuracy of the ground roll detection. Typically, a window length of 100 ms is a reasonable choice, since greater accuracy for the cone detection is normally not required. Estimating of the energy-versus-time behavior of a single data trace can be achieved in two ways:

The trace is divided into different windows and energy is determined in each window by calculating the autocorrelation (AC) function therein. Here, as mentioned above, the window length is typically 100 msec and no overlap or windowing is applied. Result of such operation is a measure of energy versus time, whereby time is chosen as center of each window where therefore the maximum energy always occurs (at zero lag). This curve of energy versus time will be referred to as the energy curve. The data is represented on a dB-scale, where the 0 dB level corresponds to the maximum energy value within the single data trace.

Complex trace analysis indicates that the envelope function may be used to calculate the instantaneous amplitude for each sample. Via a Hilbert transform the complex trace is formed from the time signal, and the envelope function is then obtained as the amplitude of the complex trace. Although the envelope is obtained for every time sample only the maximum of the envelope over a certain time window is taken as output parameter. The length of the time window is chosen identical to the time window used for correlation (100 msec).

Figure 2:
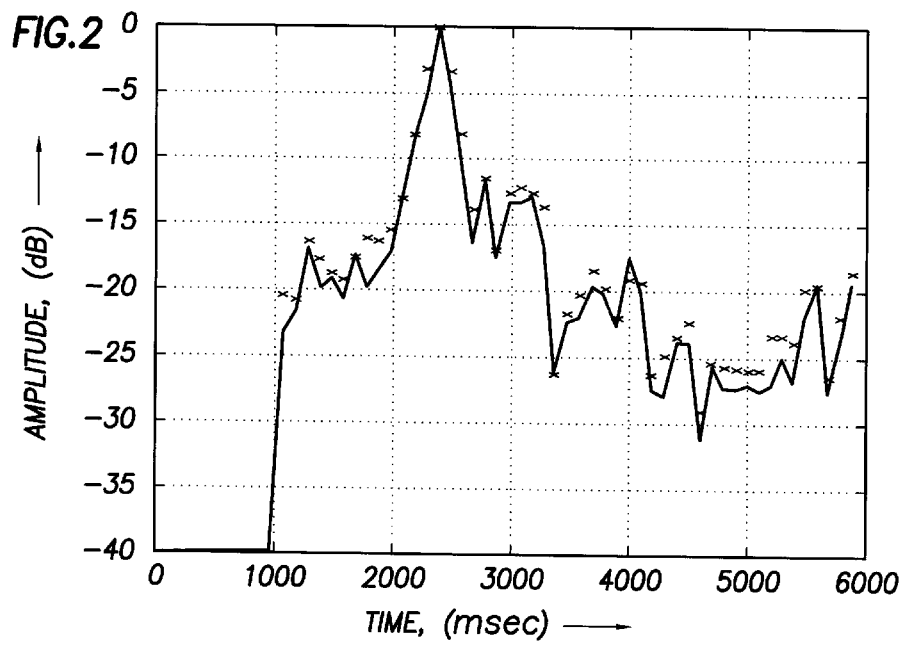
FIG. 2 is an example an energy curve of the data according to FIG. 1.

In FIG. 2 an example is shown of how the resulting energy curve looks like. The data is from the same trace as shown in FIG. 1. It can be observed that the energy curve and the envelope, indicated by crosses, give almost identical results. Thus, it is anticipated that both methods of energy detection will perform equally well. For simplicity reasons, in the following text of this section only the correlation measure is used to calculate the energy curves.

Now, after having obtained a measure for the trace energy as a function of time, those portions of the trace are to be selected whose energy lies above a certain pre-defined minimum. Rather than selecting an appropriate ground roll area the best approach is to choose a very high threshold. "High threshold" means that only a very small part of the data should lie above the threshold. On one hand, this has the advantage that presumably one of such data parts will contain the dominant part of the ground roll only. On the other hand, the main advantage is that a high threshold is much less data-dependent. From practical experiences a –6 dB threshold value (meaning that only those parts of the data will be selected for future analysis whose amplitudes lie in between 0 and –6 dB) has proven to be satisfactory for all data sets evaluated. This threshold ensures that only a (small) part of the ground roll has amplitudes in this range.

Figure 3A:
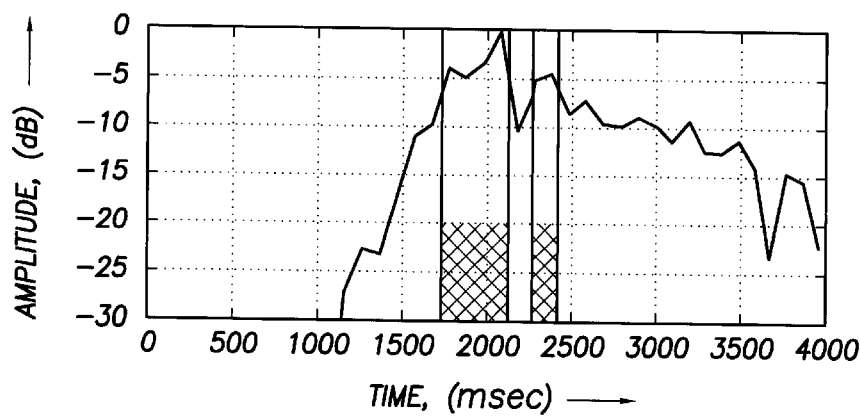
FIGS. 3a and 3b illustrate an example of an energy curve as function of time that illustrates the identification of ground roll containing data blocks FIG. 3a illustrating the result of selecting data parts which lie above the threshold value of −6 dB—, FIG. 3b illustrating an example of merging data blocks.

In FIG. 3a, the top diagram (see a)) illustrates the result of selecting data parts which lie above the threshold value of –6 dB. In this example, two different data blocks are identified that match the criteria set up by using this threshold. This process of selecting data blocks will be referred to as "blocking". Actual boundaries of the block are preferably calculated via linear interpolation. It can be noted that the maximum energy in a window always occurs at zero correlation time. Thus, the accuracy of the maximum energy determination is limited to half the window length.

One aspect of the windowing and subsequent blocking deserves some further attention. The energy curve has a rather non-smooth character, resulting in fragmented non-continuous data blocks. Smoothing over a few windows (or, alternatively, using larger windows, or overlapping windows) would reduce this effect. But this can only be achieved at the cost of less steep transitions between small energy levels and high energy levels and consequently in a greatly reduced resolving power of the blocking process. Therefore, it is preferable to keep the non-smooth character intact and handle the resulting multiple data blocks by subsequent processing.

The next step serves to smoothen the fragmented nature of the outcome of the data blocking process by two processes: Data blocks which are "close" together will be merged such that small data area in between the two blocks will be also included in the final result. Then, data blocks which cover a very small time interval are deleted.

Figure 3B:
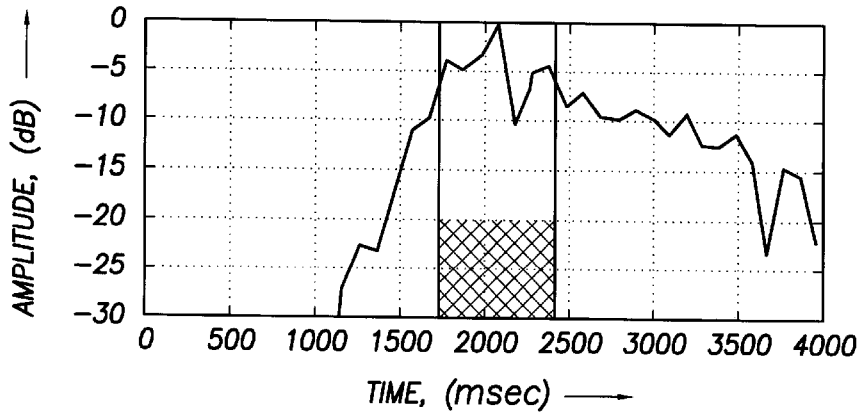

In FIG. 3b, one of the reasons for merging two closely spaced data blocks is that the dispersive ground roll train contains several modes each of them traveling with a different (frequency-dependent) velocity. As a result, the more the offset increases the more the multiple-mode ground roll train will be spread out in time. Due to such dispersion amplitude separation will be much less pronounced and, within the ground roll cone of a single data trace, lower-amplitude data blocks can be still expected to be embedded in high-amplitude data blocks. Another reason for merging closely spaced data blocks is that slight amplitude variations may well cause the discontinuous block identification: if one particular window is just below the threshold, and the adjacent window is slightly above the threshold, it makes sense to combine the two blocks. This also prevents from a detection of a huge amount of data blocks. It is evident to those skilled in the art that the maximum time interval $\Delta t_m$ between two successive blocks, below which we decide to merge the two blocks, should depend on offset. At small offsets (e.g., 500 m)., the ground roll separation is small and $\Delta t_m$ could be in the order of one window length, whereas at large offsets (a few kms), $\Delta t_m$ could be in the order of two window lengths. $\Delta t_m$ should be a rough estimate which does not impose any serious restrictions on the applicability of the aforementioned steps. A large value for $\Delta t_m$ diminishes the accuracy of the ground roll cone detection and increases the robustness of the inventive steps. An example of merging data blocks is shown in the lower diagram of FIG. 3b).

Figure 4A:
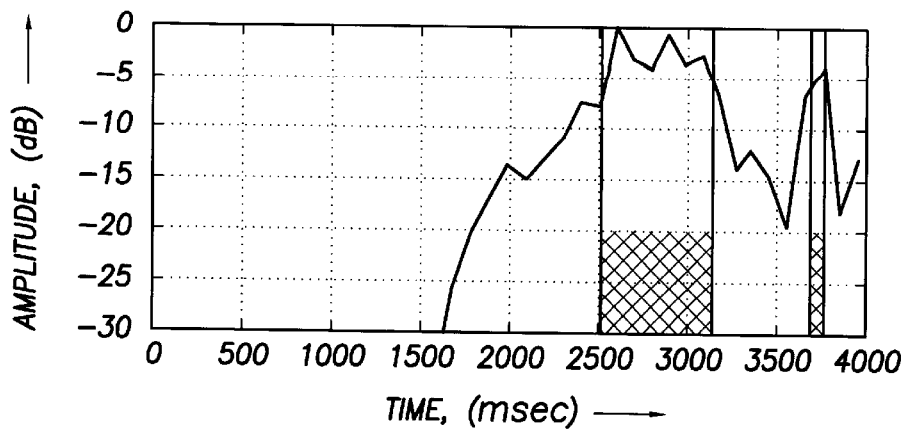
FIGS. 4a and 4b illustrate another example of an energy curve as function of time that illustrates the identification of ground roll containing data blocks FIGS. 4a and 4b illustrating data block deletion, FIG. 4a illustrating selected data blocks including a right hand data block, FIG. 4b illustrating FIG. 4a having the right hand data block deleted.
Figure 4B:
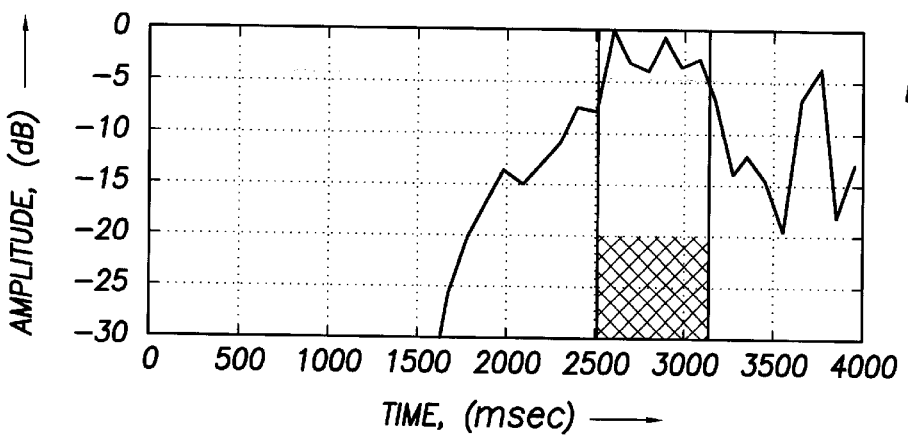

In FIGS. 4a and 4b, the reason for deleting energy levels which cover only a very small time interval is that noise bursts and high amplitude short-duration reflection signals (note that amplitudes are corrected by the $t^2$-factor!) are suppressed. Also, due to the dispersive ground roll propagation isolated short-duration surface waves in the data can not be expected. At the same time, the deletion of small data blocks improves the robustness of the inventive method and decreases its sensitivity in respect to the choice of the threshold value. The maximum value that a block length may have if it is to be deleted is thus determined by the expected length of the ground roll cone; consequently, it should be offset-dependent. Again, the maximum time interval for the deletion should not be a critical parameter. Here, because of the chosen relatively large threshold value, the selected ground roll areas that possess these amplitudes can be fairly small. In general, the number of deleted short-duration blocks should be small in order to avoid deletion of genuine ground roll energy. A good example of data block deletion is shown in FIG. 4. The selected data blocks are illustrated in FIG. 4a) whereof the 'right hand' block is very small and thus is deleted. The result is illustrated in FIG. 4b).

It should be noted that it is important to perform the merging of data blocks before the deletion process is started; otherwise, short-duration data blocks which are located close to an adjacent block will be deleted so that they cannot be merged anymore, and thus the merging process would have lost its significance.

In the next step another geophone is included into the inventive method of ground roll containing data. In principle this step is optional but is very useful to increase the robustness of the ground roll detection scheme and to improve the confidence in its result. And, more than one adjacent geophone can be used which, of course, would improve the results. For simplicity reasons, only one additional measurement is brought into the analysis. The constraints imposed are related to the location of the additional geophone(s) and are such that the geophones are sufficiently close to each other. "Sufficiently close" means that the geophones have similar amplitude-versus-time behavior. It is not required that the two geophones have the same move-out characteristic.

Figure 5A:
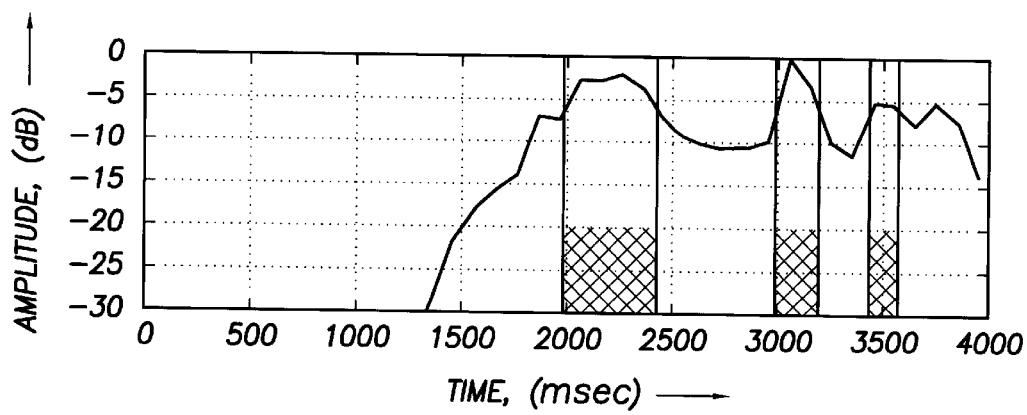
FIGS. 5a, 5b, and 5c illustrate further example of an energy curve as function of time that illustrates the identification of ground roll containing data blocks FIGS. 5a and 5b illustrating blocked data curves from two adjacent geophones 1 and 2, FIG. 5c illustrating a more robust estimate obtained by selecting only overlapping data areas from FIGS. 5a and 5b.
Figure 5B:
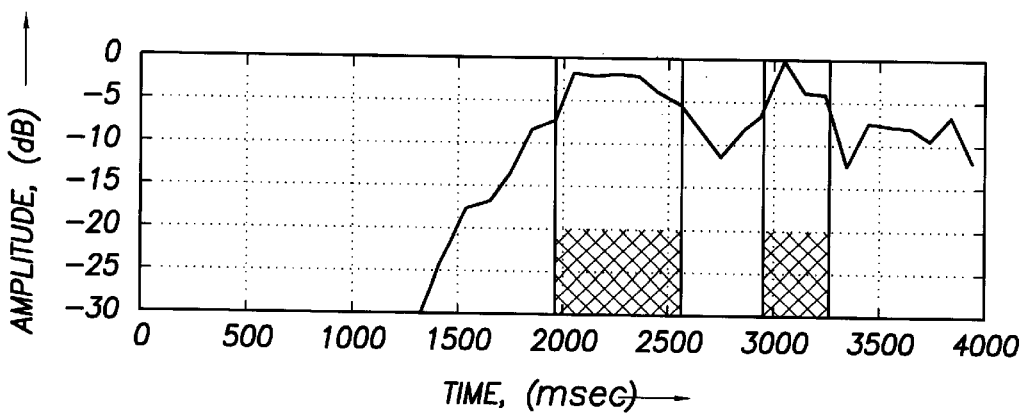
Figure 5C:
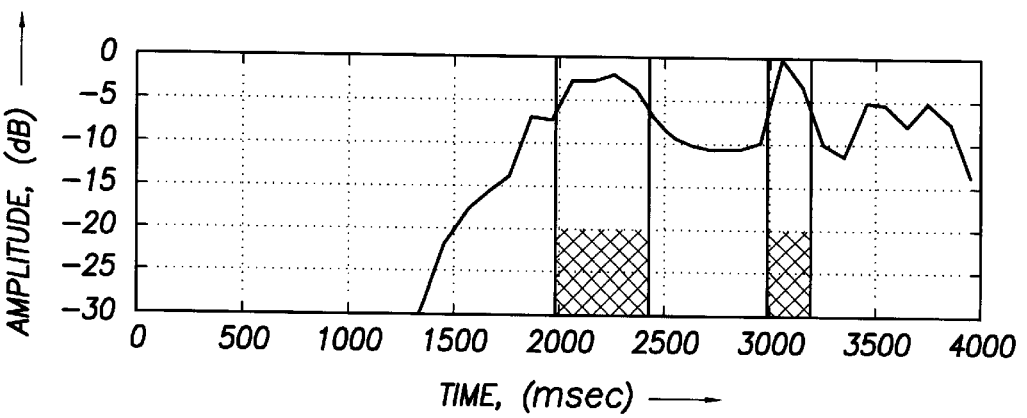

In FIGS. 5a, 5b, and 5c, after having selected after having selected (at least) an additional geophone all aforementioned steps, including subsequent data block selection are performed for the trace(s) of the additional geophone(s). For the following, and without limiting the scope of the present invention, it is assumed that the analysis has been performed for two geophones, denoted as geophone 1 and geophone 2. Now those ground roll containing data blocks from the trace of geophone 1 are selected that coincide with the data blocks that are found in the trace of geophone 2. For the presented example so far such blocks are illustrated in FIG. 5. Blocked data curves from two adjacent geophones 1 and 2 (see FIGS. 5a) and 5b)) are used to obtain a more robust estimate (see FIG. 5c)) by selecting only overlapping data areas.

At this stage, the number of possible ground roll cone estimates has been reduced significantly. In a case where only one data block was left, simply this block would be selected for further proceeding. If no data block would be left (which can be the case if the two adjacent geophones yield completely different estimates for the ground roll cone; e.g. when one of the geophone outputs is corrupted), no reliable ground roll estimate can be obtained. Normally, proper identification of bad traces can greatly reduce this problem.

The next step is to include an adjacent trace in the analysis that has a significant difference in move-out between the surface wave and the reflection energy. Rather than simply calculating the move-out a derived quantity will be used: the ratio between the differential velocity c and the average velocity U that serves as a discriminator between the different types of seismic energy. The average velocity U is defined as the average slope in the seismogram and is equal to distance divided by time:

$$U = \frac{x}{t}$$

Compared to this the differential velocity c is a local velocity of propagation. It is defined as the increase in distance divided by the increase in time; or, in other words, the trace spacing divided by the move-out:

$$c = \frac{dx}{dt} \approx \frac{\Delta x}{\Delta t}$$

An estimate of the average velocity and the differential velocity for each of the remaining data blocks is achieved by the following scheme:

for each data block:
    divide the data block into windows
    for each window:
        calculate the average velocity U for trace 1 (offset/time),
        cross-correlate trace 1 with trace 2,
        interpolate the result, and determine the maximum value,
        from this maximum value, determine the time delay,
        estimate the differential velocity c (trace spacing/time delay),
        calculate the U/c-ratio for this window
    after completion for all windows:
        calculate average U/c-ratio (e.g., as the median value over all windows)
complete for all data blocks selected The ratio U/c will also be referred to as the ratio R.

The previously calculated U/c ratio is useful to discriminate between the ground roll and other types of seismic energy. First, expected U/c ratios for the two types of waves are discussed. Then, the selection of the proper data block is explained.

Starting from the well-known NMO equation for a plane layered earth:

$$t^2 = t_0^2 + \frac{x^2}{V_{RMS}^2}$$

the move-out difference of reflection signals for two adjacent traces (indicated by subscripts 1 and 2, respectively) is obtained via the equation $$t_1^2 - t_2^2 = \frac{x_1^2 - x_2^2}{V_{RMS}^2} \approx \frac{2x\Delta x}{V_{RMS}^2}$$

in which $V_{RMS}$ denotes the RMS velocity, x1 and x2 denote the distance between the source and geophone 1 and geophone 2, respectively, x denotes the average distance between source and geophone (i.e., the average of $x_1$ and $x_2$), $\Delta x$ denotes the trace spacing, $t_1$ and $t_2$ denote the travel-times of the reflection from the source to geophones 1 and 2, respectively. This equation can be further simplified, as follows:

$$t_1^2 - t_2^2 = (t_1 - t_2)(t_1 + t_2) \approx 2t\Delta t = \frac{2x\Delta x}{V_{RMS}^2}$$

in which t denotes the average travel-time (i.e., the average of $t_1$ and $t_2$). Based on this equation using of $c=\Delta x/\Delta t$ and $U=x/t$ yields:

$$c = \frac{V_{RMS}^2}{U} \quad \text{and thus} \quad R = \frac{U}{c} = \frac{U^2}{V_{RMS}^2}$$

Figure 6:
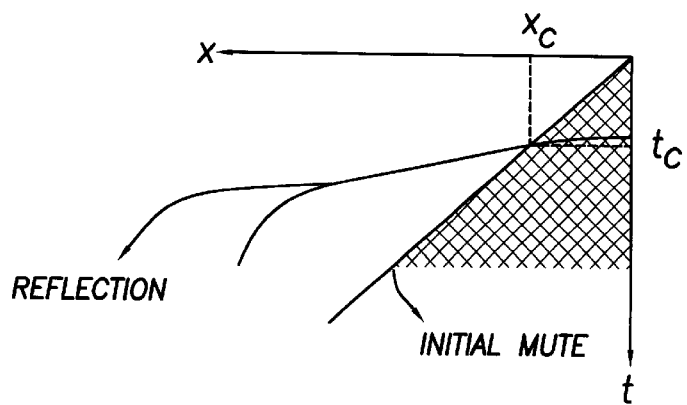
FIG. 6 is a diagram that illustrates the appearance of a shallow depth, low velocity reflection in a seismogram.

$V_{RMS}$ typically lies in the range from 1500 to 5000 m/s. The value of 1500 m/s corresponds to the ground water table; this value will be reached at very shallow depths. In view of that the area with these low RMS velocities will only occur at very small offsets. This is illustrated in FIG. 6 that shows the appearance of shallow (depth d) low-velocity reflection and the initial mute of the seismogram. Only data below the mute line is considered in the ground roll detection method, as indicated by the dashed line. The shallow reflection only enters into analysis for offsets smaller than $x_c$ and times smaller than $t_c$.

From this drawing follows that those offsets, which are affected by the low-velocity reflection, are defined by the intersection at $x=x_c$ of the reflection hyperbola and the mute line as defined by the maximum average velocity. It is evident that $$x_c = \frac{2dU}{\sqrt{V_{RMS}^2 - U^2}} \quad \text{and} \quad t_c = \frac{2d}{\sqrt{V_{RMS}^2 - U^2}}$$

in which d denotes the depth of the reflector. Inserting the appropriate values for $U_{max}$ (as explained before: a conservative estimate is 1000 m/s) and $V_{RMS}$ (1500 m/s) yields $x_c$=1.8 [m] and $t_c$=1.8 d [msec]

Even for ground water tables of several hundreds of meters, the area which has these low RMS-velocities only occupies a very small offset range. Thus, using a more reasonable value for the lower limit of the RMS-velocity of 2000 m/sec (it was already mentioned above that 1000 m/s is a realistic upper boundary for U) leads consequently to a value for R that will be smaller than 0.25 for reflections.

Contrary to that, refraction energy always arrives earlier than the corresponding reflection and has a higher differential velocity. Then, the ratio R for refractions is smaller than the ration R for reflections.

In literature, the average velocity and the differential velocity of surface waves are usually referred to as the group velocity and the phase velocity, respectively. The dominant energy of the ground roll travels with the group velocity. Since only the dominant part of ground roll has been selected, the velocity that is found after cross-correlation of adjacent geophone traces is equivalent to the group velocity (average velocity). Therefore the ratio R is a unity for surface waves:

R=1

If the selected data area also contains ground roll with smaller amplitudes and is not part of the major area of ground roll propagation the cross-correlation yields the so-called phase velocity (that is equivalent to the previously introduced differential velocity). In practice, some kind of mixture occurs between the phase velocity and the group velocity that results from the correlation process and the subsequent determination of the differential velocity. The relation between group velocity U and phase velocity c for surface waves can be described by:

$$U = c + k\frac{dc}{dk}$$

in which k denotes the wave-number $\omega/c$.

This yields:

$$c = U\left[1 - \frac{f}{c} \cdot \frac{dc}{df}\right] \quad \text{and thus} \quad \frac{c}{U} = \left[1 - \frac{f}{c} \cdot \frac{dc}{df}\right]$$

in which f denotes frequency. The relation between phase velocity and group velocity for one particular ground roll mode can be described as follows:

At low frequencies: phase velocity and group velocity are equal.

At mid frequencies: the phase velocity exceeds the group velocity, except when the shear wave velocity decreases with depth. In general, the shear wave velocity will increase with depth, and consequently dc/df will be negative and the phase velocity exceeds the group velocity. Taking into account known phase velocity curves and group velocity curves for a whole scale of different elastic parameters, the maximum ratio between phase velocity and group velocity is in the order of 4, whereas the minimum ratio is slightly larger than 1. Since all these ratios correspond to one particular frequency in the seismic data that have been processed here so far such ratios are some kind of average of these values. If the shear wave velocity decreases with depth, the group velocity exceeds the phase velocity. Further more a decrease of the shear wave velocity with depth is less significant is because the generated surface waves will suffer from radiation loss; a shear wave velocity decreasing with depth is geologically less plausible.

At high frequencies: phase velocity and group velocity are equal.

In other terms and in order to summarize these aspects:

For the dominant part of the surface waves that was selected by means of the aforementioned steps of the method according to the invention the cross-correlation process yields the group velocity of the surface waves; and consequently, the ratio R is equal to 1.

If the selected ground roll area is large, the cross-correlation process also yields phase velocity estimates. The ratio R lies between 0.25 and 1.1. The value of 0.25 corresponds to the airy phase, where the group velocity is minimum. But this is unlikely to be found in practice, because the ratio U/c that is determined according to the invention is averaged over a number of frequencies. The upper limit of 1.1 is an estimate of the U/c-ratio that may occur in the case where a shear wave velocity reversal is present. Again, this situation is unlikely to happen because the surface waves amplitudes in the relevant frequency range would suffer from radiation losses.

Figure 7A:
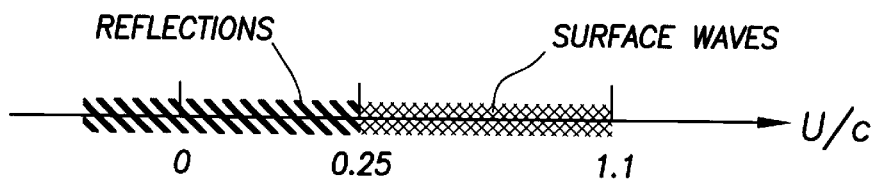
FIGS. 7a and 7b illustrate the range of possible ratios between average and differential velocity for reflection and surface waves FIGS. 7a and 7b illustrating that the reflections and the ground roll each have an estimated value of the ratio R which does not overlap for the two types of seismic energy, FIG. 7a illustrating schematically the range of possible values between average velocity U and differential velocity c, FIG. 7b illustrating the most likely range of values that are encountered in practice.
Figure 7B:
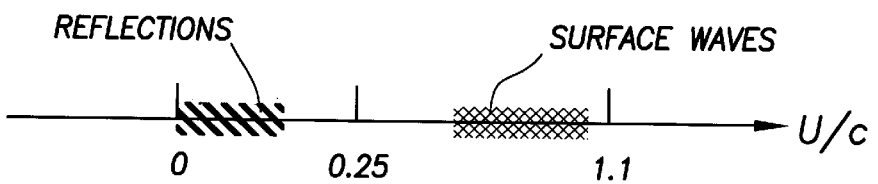

In FIGS. 7a and 7b, results of the performance so far of the inventive method to detect the ground roll cone are illustrated in FIGS. 7a and 7b. FIG. 7a) shows schematically the range of possible values between average velocity U and differential velocity c. FIG. 7b) illustrates the most likely range of values that are encountered in practice.

The ratio U/c for reflections is equal to $U^2/V^2_{RMS}$. In the worst case (average velocity and minimum RMS velocity are maximal) this ratio equals 0.25. The minimum value could, at first sight, appear to be 0 (at zero offset, where the average velocity is zero but the RMS velocity is finite); however, dipping events and non-hyperbolic reflection events may well lead to negative values of the differential velocity and consequently to negative U/c-ratios. The surface waves have a ratio which is expected to be 1, but can vary between 0.25 and 1.1. [For random (incoherent) noise, the ratio U/c may assume any value.]

These limits are summarized in FIGS. 7a and 7b that illustrates that the reflections and the ground roll each have an estimated value of the ratio R which does not overlap for the two types of seismic energy. Considering that low-velocity mode-converted waves may be present as well and that the ground roll cone itself may composed of multiple modes, the following simple scheme is introduced that explains how to identify the ground roll cone:

i. All those data blocks are excluded from further consideration which have a U/c-ratio that exceeds a certain threshold $R_{max}$. Typically, $R_{max}$ is chosen slightly above 1 (for example, 1.2). This eliminates that part of the data which is unlikely to be dominated by ground roll energy and whose velocity ratio R is suspect.

ii. Next, the data block is selected with the maximal U/c-ratio.

This scheme is attractive due to its simplicity and because it fully takes into account the uncertainties that are present in the numerical U/c-ratio estimation and the theoretical derivation of the appropriate limits. And, the assumption that the surface waves have a higher U/c than the reflections are satisfied too.

In the previous description text it was assumed that the U/c ratio can be used to discriminated between ground roll and other types of seismic waves. Additionally, however, an additional step may be introduced to improve the discrimination between ground roll and reflection energy based on the U/c ratio: a NMO-correction. Application of such a NMO-correction with a constant velocity means that the U/c ratio $R^{NMO}$ is related to the R=U/c ratio before NMO-correction as follows:

$$R^{NMO} = R\left(\frac{1+s}{1-s}\right) - \frac{2s}{1-s} \quad \text{in which} \quad s = \frac{U^2}{2v^2_{NMO}}$$

After NMO-correction a linear event (surface waves and R equals 1) will remain linear and has again a ratio $R^{NMO}$ equal to 1. A non-linear event, however, will have a ratio $R^{NMO}$ after NMO-correction which is smaller than the ratio R before NMO-correction.

In principle, the lower the NMO-velocity, the better its is for the discrimination between surface waves and reflections. A practical limit, however, is set by a NMO-stretching effect, due to which the data after NMO is enriched in lower frequencies. NMO-correction results in a frequency-shift of the data, whose magnitude is given by $$\frac{\Delta f}{f} = -s$$

A very low value of s would increase the contrast in the R-ratio between reflections and surface waves, but would at the same time alter the data such a way that the low frequencies dominate the entire seismic trace; the move-out would be difficult to estimate. It is therefore important to keep the value of s limited.

The selection between different wave types after NMO-correction is similar to the selection prior to the NMO-correction; we only adapt the threshold $R_{max}$ by subjecting $R_{max}$ to the transformation which represents the data after NMO:

$$R^*_{max} = R_{max}\left(\frac{1+s}{1-s}\right) - \frac{2s}{1-s}$$

Similar to what was mentioned above the data block with the largest R-ratio is selected after the pre-selection using $R^*_{max}$.

Figure 8:
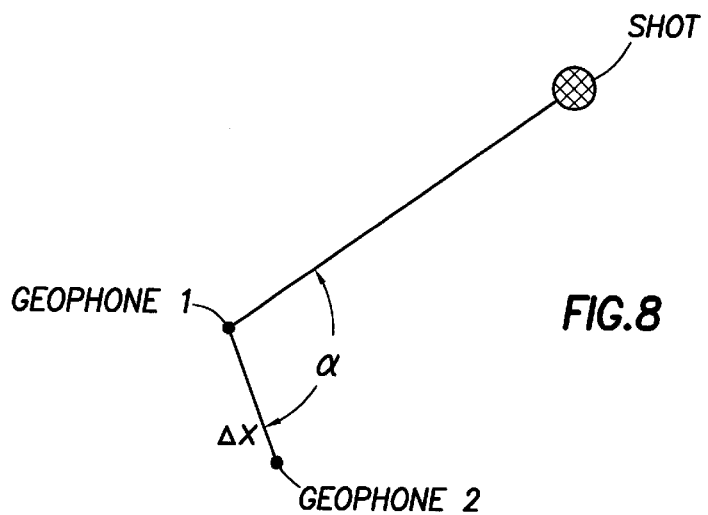
FIG. 8 illustrates a geometrical offset correction for 3D geophone configuration.

If source and receiver are not in-line as shown in FIG. 8, a correction is needed for move-out value found during the correlation process. The time difference Δt of the ground roll (traveling with a velocity c) between geophone #1 and geophone #2, who are spaced a distance Δx apart from each other, is given by $$\Delta t = -\frac{\Delta x}{c} \times \cos(\alpha)$$

[instead of $\Delta t = \frac{\Delta x}{c}$ as for usual in-line arrangement].

The phase velocity c must be adapted accordingly by a multiplication with the cos(α)-term.

The previous description of the inventive method to detect ground roll cone concerned the case where no prior knowledge is required of the ground roll velocity in the area where the seismic survey is (or was) performed. One of the essential elements of the inventive method described so far requires a minimum of at least two input traces at each receiver station. In this scheme that has been referred to as the dual sensor scheme the phase velocity (of the ground roll) has been determined via a calculation of the move-out between adjacent traces. In the following text a second scheme according to the present invention will be described that is capable of determining the ground roll using a single geophone per receiver station only. Here, it is required that the user provides an estimate of the ground roll velocity in the area. This scheme is referred to as the single sensor scheme.

The single sensor scheme:

In case that the inventive method only makes use of a single geophone (rather than combining the output of two geophones, to discriminate between different data blocks on the basis of the previously described ratio between average velocity and differential velocity), only the average (=group) velocity is used as a selection criterion. In this case the group velocity is calculated for each data block. For this calculation, it is assumed that the arrival time is given by the time corresponding to the center of a time window. The group velocity is obtained by dividing the offset by said arrival time. Then, the data block, whose group velocity is closest to a user-input ground roll velocity (and for which the absolute value of the difference between the two is minimum) is selected.

All following steps of the method of ground roll detection according to the invention are performed for the single sensor as well as for the aforementioned dual sensor scheme.

Now that the data block which represents the dominant part of the surface wave has been established, the question is how long the ground roll window should be. So far, only that part of the ground roll which has the highest amplitudes (0 to −6 dB) was selected. The problem is to extend this area to a reasonable time duration, without introducing any new parameters which are sensitive to the type of data that are processed. The following approach ensures this:

First, the data limits $t_1$ and $t_2$ are determined for different amplitude threshold values. The first threshold value is the −6 dB limit that was used in one of the previous steps of the dual sensor scheme. Having kept in mind that this data block has been subject to previously described move-out based analysis (or, for the single sensor approach, the comparison with the user-input velocity). This data block also contains the true ground roll which is employed as a selection criterion for the next amplitude blocking results using different thresholds. Now, a data block is identified with amplitudes between 0 and −7 dB which step is carried out by ordinary blocking as explained above with optionally using two or more traces. This blocking normally results in several data blocks. But the selection of a particular and appropriate data block does not require to be done on the basis of move-out or comparison with the user-input velocity (as has been explained for the dual sensor scheme above). Since the extensive ground roll selection was already performed and discussed before for the −6 dB threshold result, simply that data block is chosen which overlaps with the previously found 0 to −6 dB data block (containing ground roll only!). Then a data block is determined with 0 to −8 dB amplitude values; and so on for the next limits. This procedure is repeated again and again until, for example, the 0 to −40 dB data block, which will in most cases contain all the data in the trace.

Figure 9A:
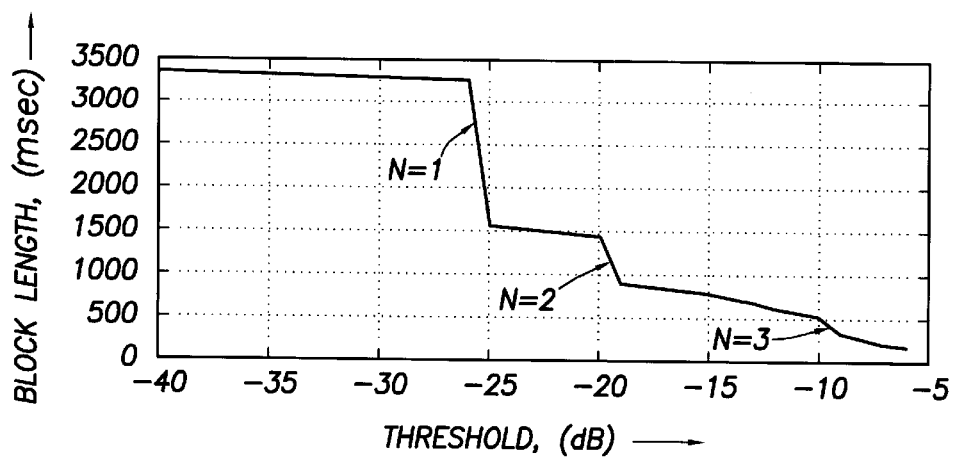
FIGS. 9a, 9b, and 9c display differential changes in length of data blocks that are potential ground roll candidates FIG. 9a illustrating a display of the data block length as a function of threshold value, FIG. 9b illustrating the fact that the peaks from the differential curve are sorted in the order or increasing (absolute) magnitude as indicated by the arrows, FIG. 9c illustrating a real data example in which the original ground roll window has been extended by the inventive method of the present invention to the data block.

In FIG. 9a, in the next step the data block length is displayed as a function of the threshold value. An example of such a display is shown in FIG. 9a. In this FIG. 9a the threshold value is shown on the horizontal axis which may assume values between −6 dB and −40 dB. The vertical axis indicates the ground roll window length which is detected by the inventive method for a particular amplitude threshold value. Obviously, the smaller (i.e., the more negative) the threshold is, the more the time window increases and the more data qualify as potentially ground roll containing areas. At its limit, as the threshold tends to negative infinity, the selected data window becomes equal to the complete trace length. All amplitudes in the data then lay above the threshold. The resulting curve is thus monotonically decreasing and few sharp transitions are visible in the curve. These transitions (the largest of which are referenced to, in FIG. 9b, by the arrows and labeled as N=1, 2 or 3) indicate that, if the threshold is changed by a small amount, the window length changes more than proportional. These sudden changes in window length can be attributed to changes in wave types arriving at the geophone.

Referring to FIG. 9, rather than displaying the total window length as a function of threshold, the transitions are accentuated by displaying the differential window length, which means the change in the estimated ground roll window if the threshold value is changed 1 dB increments. The transitions are then clearly visible as peaks in the differential curve.

Figure 9B:
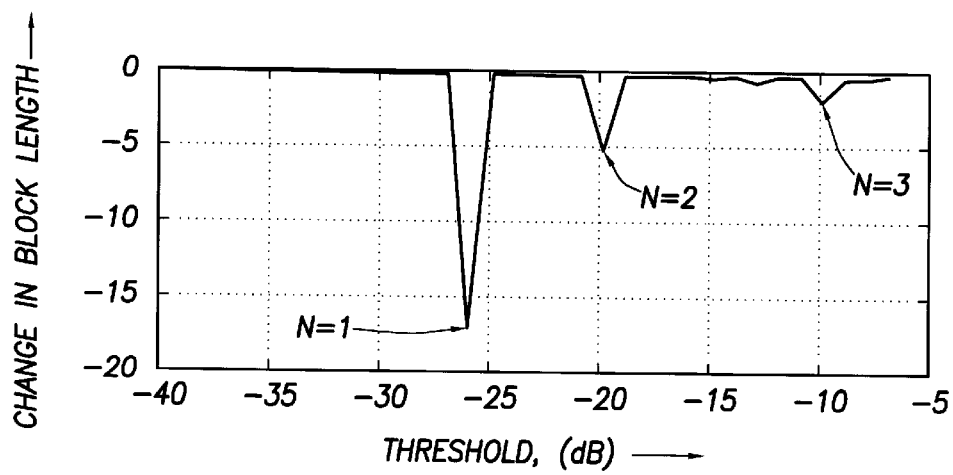

In order to obtain a robust scheme for ground roll detection according to the invention the following steps are performed:

The peaks from the differential curve are sorted in the order of increasing (absolute) magnitude as shown in the drawing of FIG. 9b indicated by the arrows. These peaks correspond to the transitions that were observed in FIG. 9a. The largest peak is denoted as N=1, the smallest as N=3.

The highest N peaks are selected. Due to the non-smooth nature of the energy curve, there will be a lot of peaks in the data, most of which are insignificant; therefore, only the most relevant peaks are chosen (a value for N of 3–5 is recommended); and as stated before, for the purpose of this example, a value of N=3 is used.

By this the problem of finding the temporal extent of the ground roll has been reduced to the problem of which of the N peaks to select. Each peak corresponds to a certain ground roll window. This is illustrated in FIG. 10. In FIG. 10 the 300 msec data window corresponding to the smallest transition N=3 which covers a time interval AB. The second peak N=2 that corresponds to a higher threshold is indicated by a time window CD; and, finally, the largest peak N=1 yields a ground roll window EF. The length of these windows can also be obtained directly from FIGS. 9a through 9c. For example, in FIG. 9a, looking at the transition indicated by N=1, a threshold of −25 dB leads to a 1500 msec window length, whereas a −26 dB threshold immediately increases the window length to 3200 msec. Thus, in this case the 1500 msec window corresponds to N=1 (or, referring to FIG. 10, to the distance EF).

In principle, such peak is selected which is closest to the original window position (the window that was found with the full-blown processing over the 0 to −6 dB amplitude range). Thus, in the example of FIGS. 9a through 9c and 10, the peak indicated by N=3 would be selected. There is, however, one noticeable and important exception: if the additional data area between the window corresponding to N=3 (the window AB, which is closest to the original window) and any one of the remaining N−1 data windows (at N=1, or at N=2) can be identified as ground roll with a large amount of confidence, this other window will be used (and consequently enlarge the estimated ground roll window). Referring to FIG. 10, the used window (AB) is indicated by N=3. From FIGS. 9a through 9c it is known that this window corresponds to a ground roll window of 300 msec, at a −8 dB threshold.

Next, the window corresponding with N=2 is evaluated. This yields an estimated ground roll window of 900 msec (at a −18 dB threshold value), as can be seen from FIGS. 9a through 9c. In FIG. 10, this window is indicated by the time interval CD. Now a decision has to be taken whether this 600 msec of additional data (representing the difference between the 300 msec window and the 900 msec window) is indeed representing ground roll. The extra data parts AC and BD are evaluated separately, and then either AC, or BD, or both, or none can be selected.

The additional data is selected if—and only if—the following three criteria are met simultaneously for the additional data (AC or BD):

a. The data has a group velocity/phase velocity ratio which is acceptable (between 0.2 and 1.1). This criterion is only applied for the dual sensor scheme.

b. The data has a maximum amplitude which is not negligible (less than 20 dB below the maximum amplitude in the "primary" ground roll window)

c. The minimum and maximum ground roll velocity that are obtained when the additional data is accepted as ground roll, do not deviate too much from the dominant ground roll velocity (the group velocity). If the dominant ground roll velocity is denoted by U and the minimum and maximum velocity by $v_{min}$ and $v_{max}$, respectively, it is required that $$\alpha v_{min} \leq U \text{ and}$$

$$U \leq \frac{v_{max}}{\alpha}$$

where $\alpha$ is an input parameter. A value slightly larger than 2 is a reasonable choice for $\alpha$. Thus, if the dominant ground roll velocity is, for example, 300 m/s, we do not accept ground roll velocities larger than (approx.) 600 m/s or smaller than (approx.) 150 m/s. Excessively large ground roll windows are avoided and a somewhat conservative estimate is obtained, which is less likely to be an error. The reason for this criterion is that it is better to miss a small part of the ground roll cone than to include part of the data where reflections prevail (which could be deteriorated if ground roll is removed from this section.

Referring to FIG. 10, this procedure is carried out in practice as follows. The main ground roll velocity U is determined from the center of the initial data window AB. Next, the additional data area AC is treated. Point C corresponds to a certain velocity $v_{max}$ which is then verified whether $v_{max}$ satisfies the above mentioned criterion. Point D, which corresponds to a certain value for $v_{min}$ is treated; this velocity must satisfy the aforementioned criterion too.

Imposing these rather strict criteria ensures that data transitions between strong reflections and lower noise levels are not picked as ground roll boundaries. Of course, a similar selection is subsequently applied to additional data windows CE and DF (provided one of the windows AC and BD qualified as ground roll).

If the move-out selection is not applied, but replaced by the user-input selection criterion (single sensor scheme) only selection criteria b and c (above) apply.

Figure 9C:
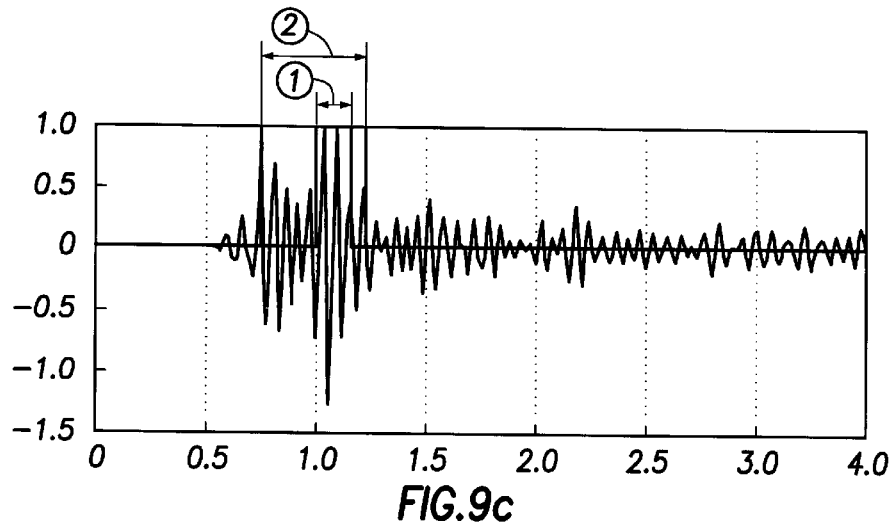

FIG. 9c shows a real data example in which the original ground roll window, which is referred to by ①, has been extended by the aforementioned inventive method of the data block which is referred to by ②.

The previous steps complete the determination of the ground roll window for a single pair of geophones at a single receiver station. If more pairs of geophones are used at the receiver station, multiple ground roll estimates are obtained which must be combined to yield a single ground roll window estimate at this receiver station. Selection of the common ground roll part seems a logical choice, provided that bad traces have been removed from the data prior to the application of the ground roll estimation process. What remains now is to combine all local estimates of the ground roll area from each individual receiver stations to yield a global estimate for the ground roll velocity encountered in this particular shot for all offsets.

At this stage of the estimation scheme, a set of ground roll time windows—or, equivalently, a set of ground roll velocities—has been made available, each of which corresponds to a particular offset. Preferably the obtained set of minimum and maximum ground roll velocities should be used rather than the estimated time windows. Normally, the ground roll area is specified as a cone, defined by a minimum and maximum velocity—or, equivalently, by two straight lines in the x-t space. Obtaining a robust median operator to average the results is most easily achieved by using the velocity information, because the velocities should be constant for each offset whereas the time windows should shift in time, depending on the offset.

The proposed scheme can then be summarized as follows:
For each receiver station offset, determine the minimum and maximum ground roll velocity.
Take the median value of each of these two sets to arrive at a global estimate of the minimum and the maximum ground roll velocity.
Calculate the corresponding ground roll cone (time versus offset) for each receiver station by dividing the offset of each receiver station by this median value of the minimum and maximum ground roll velocities.

Alternatively, non-uniform ground roll behavior may be encountered within a shot record (due to varying surface conditions and dispersion). In this case, the total range of offsets is split at A in two parts: a near offset part (where $0 \leq x \leq A$), and a far offset part (where $A \leq x \leq x_{max}$). The ground roll cone needs to be described by the following two lines:

(i) for small offsets ($0 \leq x \leq A$): ground roll arrival through the origin in x-t form by:

$$t = \frac{x}{v_1}$$

The ground roll velocity $v_1$ is calculated using the normal procedure, described previously. The detection scheme yields the arrival time t, the offset x is known. A series of velocity estimates can then be derived and the final estimate for $v_1$ is chosen as the median of these values.

(ii) for large offsets ($A \leq x \leq x_{max}$): ground roll arrival coincides with the previously calculated line for small offsets at x=A (continuity):

$$t = \frac{A}{v_1} + \frac{x - A}{v_2}$$

From the detection scheme, the arrival time estimates t is known. From the previous step, $v_1$ has been estimated. Thus, a series a ground roll velocity estimates for the second offset range can be constructed by using $$v_2 = \frac{x - A}{t - \frac{A}{v_1}}$$

Again, the final velocity estimate is obtained as the median of all $v_2$-values found. Of course, this approach can be extended to include more than two line segments, but in practice this does not seem to be worthwhile.

FIGS. 11a and 11b illustrates the procedure when the ground roll area is not desired to be parameterized by only a single line but includes the offset dependency in the final estimate. To achieve this, the arrival times which have been obtained from the above explained detection scheme—FIG. 11a—are separated into two offset ranges. For each offset range, a separate average is constructed as shown in FIG. 11b.

Although the single sensor scheme has been described and explained without any reference to a geophone type, it is evident for those skilled in the art that the inventive single sensor scheme may be performed for a 1C-geophone or for the components of a 3C-geophone.

Figure 12A:
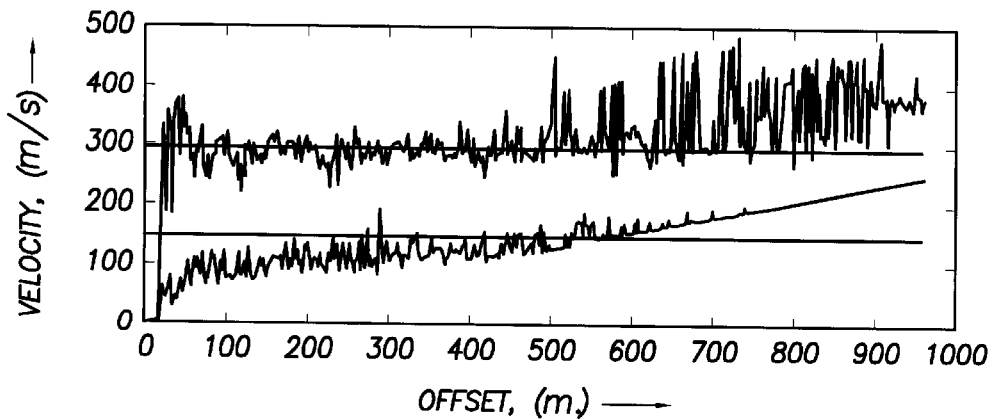
FIGS. 12a, 12b, and 12c illustrate example results of data treated according to the invention FIG. 12a illustrating the minimum and maximum estimated ground roll velocity as a function of the source-receiver distance using the single sensor scheme according to the invention, FIG. 12b illustrating the minimum and maximum estimated ground roll velocity as a function of the source-receiver distance using the dual sensor scheme according to the invention, FIG. 12c illustrating a comparison between the median velocity values using the dual sensor scheme and the single sensor scheme.
Figure 12B:
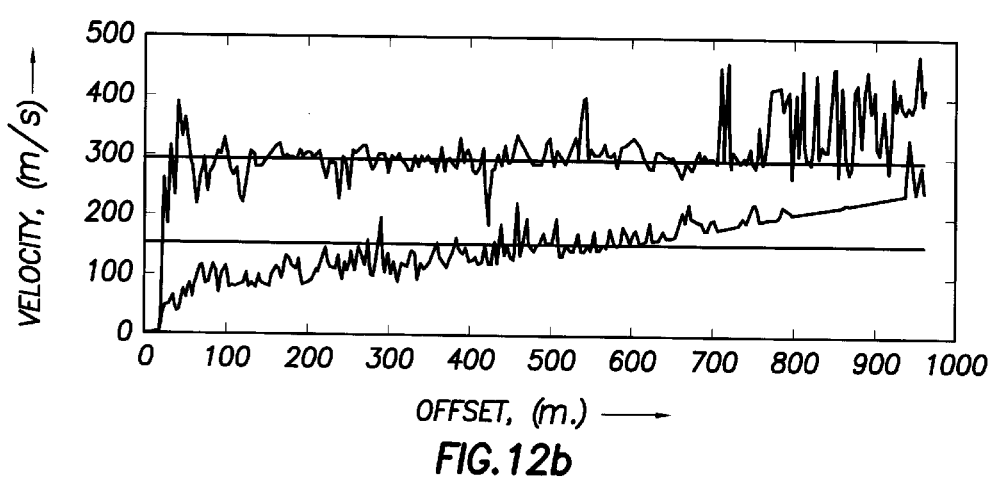
Figure 12C:
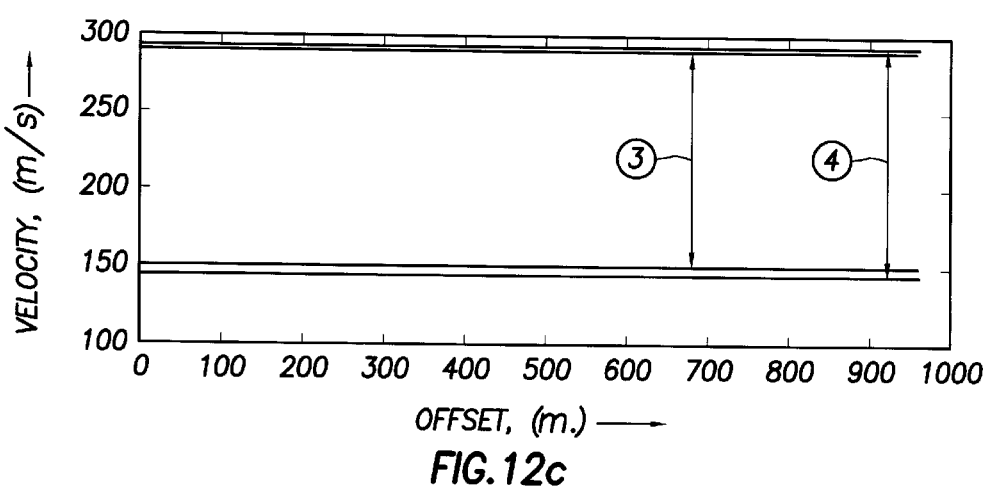
Figure 13:
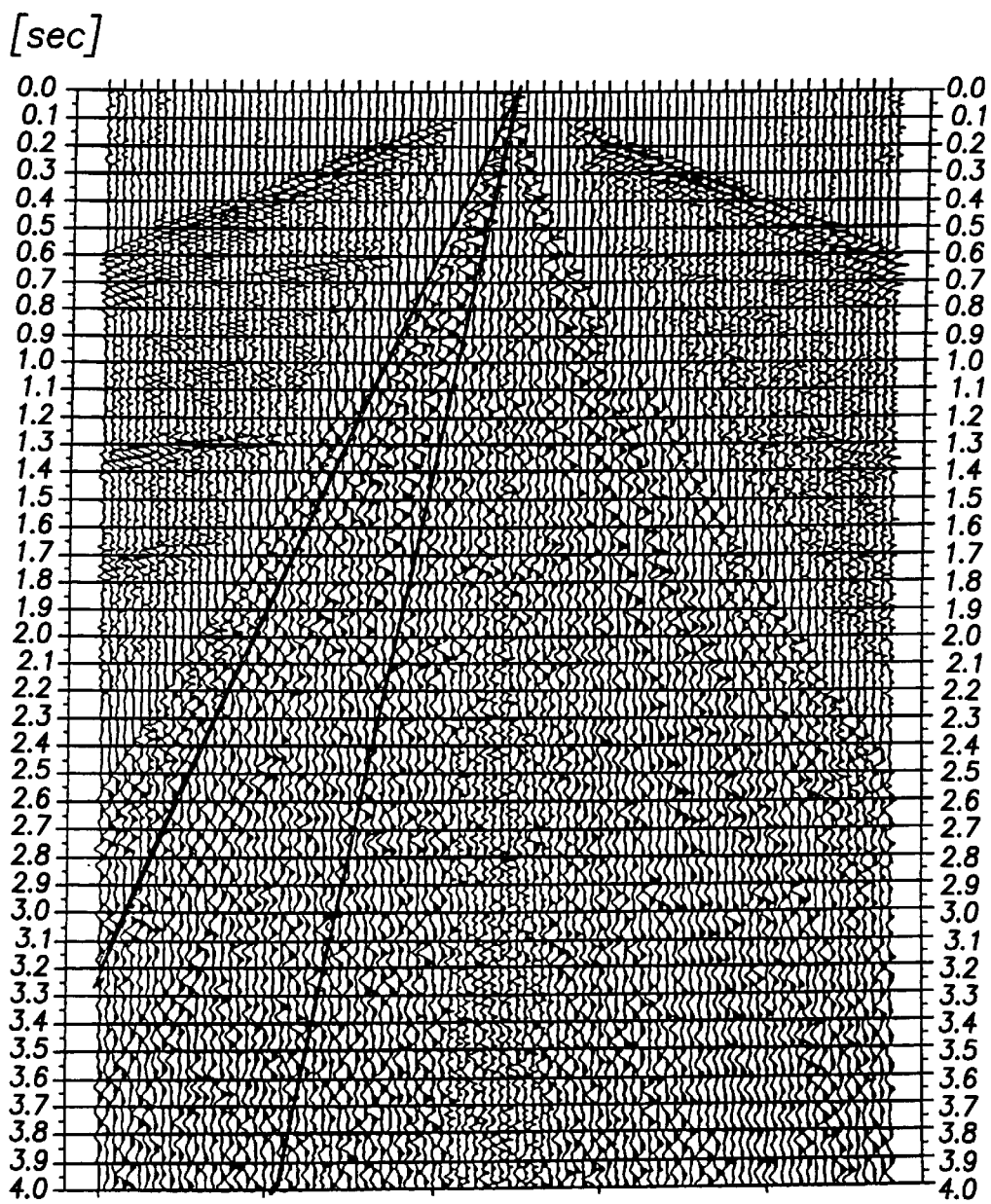
FIG. 13 is a display of recorded field data with included ground roll estimate.
Figure 14:
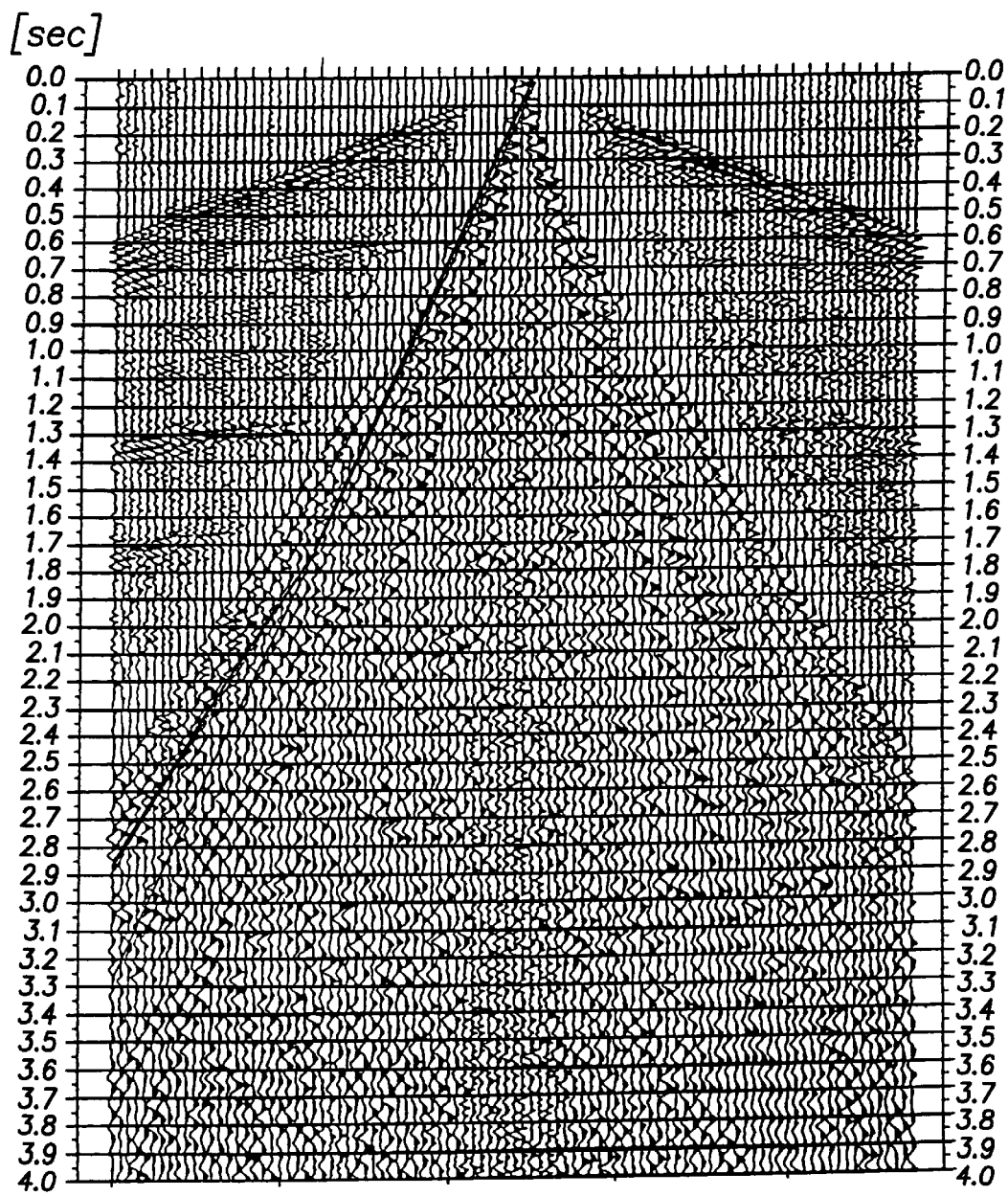
FIG. 14 is another display of the data according to FIG. 13 with indication of the top of ground roll cone.

In the previous description text, the automatic ground roll detection scheme according to the invention has been presented in detail. FIGS. 12, 13 and 14 show results of having the inventive method applied to seismic field data (specifications: 2 m geophone spacing, Vibroseis, maximum offset 1 km):

In FIGS. 12a, 12b, and 12c, the drawings of FIGS. 12a through 12c illustrate results using both the single sensor approach and the dual sensor approach. The results comprise the minimum and maximum velocity estimates for all offsets and their median values. FIG. 12a shows the minimum and maximum estimated ground roll velocity as a function of the source-receiver distance, using the single sensor scheme according to the invention. The lines represent the median values of the two curves. In FIG. 12b shows again the minimum and maximum estimated ground roll velocity as a function of the source-receiver distance, but using the dual sensor scheme according to the invention. In FIG. 12c a comparison is shown between the median velocity values using the dual sensor scheme (indicated by ③) and the single sensor scheme (indicated by ④).

Also, the final result of the estimation, indicated on a plot of the seismic traces, is shown in FIG. 13 where only the results of the single sensor approach are displayed, because the difference between the velocity estimates of the single sensor approach and the dual sensor approach were small.

It is important to note that the input parameters for the estimation were identical for all data sets when using two geophones per receiver station. Only for the single sensor scheme, a user estimate is required of the expected ground roll velocity.

The results clearly show that the automatic ground roll estimates are accurate, though conservative (based on a visual inspection, one would normally pick a ground roll cone which is slightly broader). Also, both schemes yield comparable results, although some differences do exist. The dual sensor scheme using two geophones per station has the advantage that no user input is required, and the estimated velocities also take into account the physical properties of ground roll propagation velocities via the move-out calculation; the disadvantage is that the computational load is increased because the move-out is calculated via a correlation process. The single sensor scheme that in principle only requires a single geophone per receiver group has the advantage that it is fast, but it requires a priori knowledge of the ground roll velocity (although this a priori input need not be very accurate).

A linear trend is visible for the minimum velocity estimate at the large offsets. This is easily explained by the finite recording time of the data: at a given offset, the latest ground roll arrival arrives after the maximum recording time. In this case, the inventive scheme detects the maximum recording time as the end of the ground roll window, for all these offsets. Consequently, as the velocity estimate is equal to the offset divided by the time (which is thus constant and equal to the maximum recording time), the velocity is directly proportional to the offset. This effect, of course, needs to be taken into account: if the detected arrival times are close to or equal to the recording time, these values should be ignored.

FIG. 14 shows an example of the technique where the ground roll estimate is calculated separately for the two different offset ranges according to FIG. 11: the small offsets, and the large offsets. The nonlinear shape of the ground roll cone can clearly be observed (see also FIG. 13. For this case, the dual offset approach is performed for the high ground roll velocities only (the small ground roll velocities, in this case, were all outside the record length for the larger offsets). The result, as shown in FIG. 14, illustrates that the ground roll cone estimate is improved by this approach. In the calculation, results from the single sensor approach were used. For comparison: the result without splitting the offset in two ranges was an estimate of 300 m/s, if the offset is split in two ranges, a value of 285 m/s for the first offset range is found and a value of 385 m/s for the second offset range.

What is claimed is:

1. A method of automatically detecting a ground roll cone in seismic data, the method comprising the following steps:
    (a) in respect to one receiver station, where the output data resulting from one shot is gathered from several geophones, selecting a trace of seismic raw data from a first geophone;
    (b) determining in the data trace of the first geophone data blocks in form of time windows where signal amplitude/energy lies above a predefined reference level;
    (c) merging together adjacent data blocks determined in step (b) and suppressing very small data blocks identified in step (b);
    (d) repeating the process with the data from the other geophones, and then calculating for each set of two adjacent traces that were obtained according to step (c) a ratio between average velocity and differential velocity in each selected data block by process of cross-correlation in order to discriminate between various types of seismic energy on the basis of their move-out;
    (e) comparing the ratios between average velocity and differential velocity determined in step (d) with a predefined favorable ratio between average velocity and differential velocity and identifying a data block with a most favorable ratio; and
    (f) by evaluating amplitude behavior near the edges of the selected data block of step (e), extending this data block such that it includes all relevant and dominant ground roll energy.

2. A method according to claim 1, further including the step of filtering out data with a velocity below a reference velocity between steps (a) and (b).

3. A method according to claim 1, further including the step of applying a band-pass filter to the data between steps (a) and (b).

4. A method according to claim 1, further including the step of applying a time-variant amplitude correction to the data between steps (a) and (b).

5. A method according to claim 1, further including the step of performing an NMO correction of the data between steps (a) and (b).

6. A method according to claim 1, further including the step of:
    (g) similarly determining the ground roll containing data blocks in the data traces from the other geophones of the receiver station.

7. A method according to claim 6, further including the step of:
    (h) repeating the process for data traces for the same shot and gathered at other receiver stations in order to obtain other ground roll velocity estimates, and determining therefrom a minimum and maximum ground roll velocity that define the ground roll cone.

8. A method of determining the ground roll cone in seismic data, the method comprising the following steps:
   (a) in respect to one receiver station, where output data resulting from one shot is gathered from several geophones, selecting a trace of seismic raw data from a first geophone;
   (b) determining in the data trace of the first geophone data blocks in the form of time windows where signal amplitude/energy lies above a predefined reference level;
   (c) merging together adjacent data blocks determined in step (b) and suppressing very small data blocks identified in step (b);
   (d) calculating for each selected data block according to step (c) an average velocity, and comparing such average velocities with a reference average velocity, and identifying a particular data block with an average velocity that is closest to the reference average velocity; and
   (e) by evaluating amplitude behavior near the edges of the selected data block of step (d), extending this data block such that it includes all relevant and dominant ground roll energy.

9. A method of claim 8, further including the step of filtering out data with a velocity below a reference velocity between steps (a) and (b).

10. A method of claim 8, further including the step of applying a band-pass filter to the data between steps (a) and (b).

11. A method of claim 8, further including the step of applying a time-variant amplitude correction to the data between steps (a) and (b).

12. A method of claim 8, further including the step of:
   (f) similarly determining the ground roll containing data blocks in the data traces from the other geophones of the receiver station.

13. A method of claim 12, further including the step of:
   (g) repeating the process for data traces for the same shot and gathered at other receiver stations in order to obtain other ground roll velocity estimates, and determining therefrom a minimum and maximum ground roll velocity that define the ground roll cone.

14. A method according to claim 10, wherein the band-pass filter has a pass band of 10 to 30 Hz.

15. A method according to claim 9, wherein the reference velocity used is of the order of the shear wave velocity of the deepest layer of interest.

16. A method according to claim 15, wherein the reference velocity is selected such that the large-amplitude first-arrivals in the data trace are filtered out.

17. A method according to claim 10, wherein the band-pass filter is implemented as a Quadrature Mirror Filter.

18. A method according to claim 8, wherein before step (c) is performed, previous steps (a) and (b) are applied to a raw data trace of at least a second geophone connected to the same receiver station, and then data blocks are selected, according to step (b), that are common for all data traces.

19. A method according to claim 13, wherein a median filter is used for obtaining minimum and maximum ground roll velocity that define the ground roll cone.

20. A method of determining the ground roll cone in seismic data, the method comprising the following steps:
   (a) selecting a trace of seismic data from a first geophone;
   (b) determining in the data trace of the first geophone data blocks in the form of time windows where signal amplitude/energy lies above a reference level;
   (c) merging together adjacent data blocks determined in step (b) and suppressing very small data block identified in step (b);
   (d) calculating for each selected data block according to step (c) an average velocity, and comparing such average velocities with a reference average velocity, and identifying a particular data block with an average velocity closest to the reference average velocity; and
   (e) determining a minimum and maximum ground roll velocity that define the ground roll cone utilizing said identified data block.

* * * * *